United States Patent [19]

Nelson et al.

[11] 4,294,513
[45] Oct. 13, 1981

[54] OPTICAL SENSOR SYSTEM

[75] Inventors: David E. Nelson; John V. Bouyoucos, both of Rochester, N.Y.

[73] Assignee: Hydroacoustics Inc., Rochester, N.Y.

[21] Appl. No.: 74,270

[22] Filed: Sep. 11, 1979

[51] Int. Cl.³ ............................................ G02B 5/172
[52] U.S. Cl. .............................. 350/96.29; 350/96.15; 350/96.17; 455/612
[58] Field of Search ............... 350/96.13, 96.15, 96.17, 350/96.20, 96.21, 96.29, 96.30; 250/199, 227; 370/1; 455/610, 611, 612

[56] References Cited

U.S. PATENT DOCUMENTS

| | | | |
|---|---|---|---|
| 3,051,003 | 8/1962 | Witt | 73/388 |
| 3,056,297 | 10/1962 | Duke | 73/398 |
| 3,625,589 | 12/1971 | Snitzer | 350/96.29 |
| 3,645,603 | 2/1972 | Smith | 350/96.29 X |
| 3,704,060 | 11/1972 | McNaney | 350/96.29 X |
| 3,777,150 | 12/1973 | Miller | 350/96.15 X |
| 3,802,760 | 4/1974 | Sosnowski | 350/96.13 |
| 3,804,489 | 4/1974 | Li et al. | 350/356 |
| 3,856,378 | 12/1974 | Brandt et al. | 350/96.13 |
| 3,931,518 | 1/1976 | Miller | 250/227 |
| 4,019,051 | 4/1977 | Miller | 250/227 |
| 4,071,753 | 1/1978 | Fulenwider et al. | 250/227 |
| 4,076,375 | 2/1978 | Muska et al. | 350/96.15 |
| 4,078,432 | 3/1978 | Stewart | 250/227 X |
| 4,106,848 | 8/1978 | Conwell et al. | 350/96.14 |
| 4,128,299 | 12/1978 | Maher | 350/96.13 |
| 4,135,780 | 1/1979 | Dyott | 350/96.15 |
| 4,142,774 | 3/1979 | Wright | 350/96.12 |
| 4,162,397 | 7/1979 | Bucaro et al. | 250/199 |
| 4,188,087 | 2/1980 | d'Auria et al. | 350/96.20 |

FOREIGN PATENT DOCUMENTS

| | | | |
|---|---|---|---|
| 529 | 2/1979 | European Pat. Off. | 350/96.15 |
| 7811989 | 6/1979 | Netherlands | 350/96.15 |

OTHER PUBLICATIONS

Shajenko, "Progress On Optical Hydrophones", *U.S. Navy Journal of Underwater Acoustics*, vol. 29, No. 2, Apr. 1979, pp. 169–178.
Hardy, "Coupled Mode Switching Device", *IBM Tech. Discl. Bulletin*, vol. 7, No. 6, Nov. 1964, pp. 480–481.
Keck et al, "Attenuation of Multimode Glass Optical Waveguides", *Appl. Phys. Lett.*, vol. 21, No. 5, Sep. 1972, pp. 215–217.
Jeunhomme et al, "Directional Coupler for Multimode Optical Fibers", *Appl. Phys. Lett.*, vol. 29, No. 8, Oct. 1976, pp. 485–487.
Gfeller et al, "Modulator and Tap for Optical Fiber Systems", *IBM Tech. Discl. Bull.*, vol. 21, No. 5, Oct. 1978, pp. 2014–2015.

*Primary Examiner*—John D. Lee
*Attorney, Agent, or Firm*—Martin Lukacher

[57] ABSTRACT

An optical transducer with an optical waveguide having two paths for the propagation of light is deformed in response to acoustical pressure variations or other parameters to be sensed to modulate the amplitude of the light propagated along the two paths in opposite polarities. The light outputs of the two paths are sensed by photodetectors and applied to an electrical differencing circuit. The mean values of the photodetector outputs are balanced as by mechanically providing a predetermined bias deformation of the fiber, or by electrically matching outputs of the detectors such that, on the average, the output of the differencing circuit is zero. Dynamic deformation of the fiber in the transducer results in unbalanced outputs of the photodetectors which unbalance is sensed by the differencing circuit. This differential detection method minimizes optical and mechanical sources of noise in the light source and waveguide and leads to increased signal-to-noise and enhanced dynamic range of the transducer.

29 Claims, 9 Drawing Figures

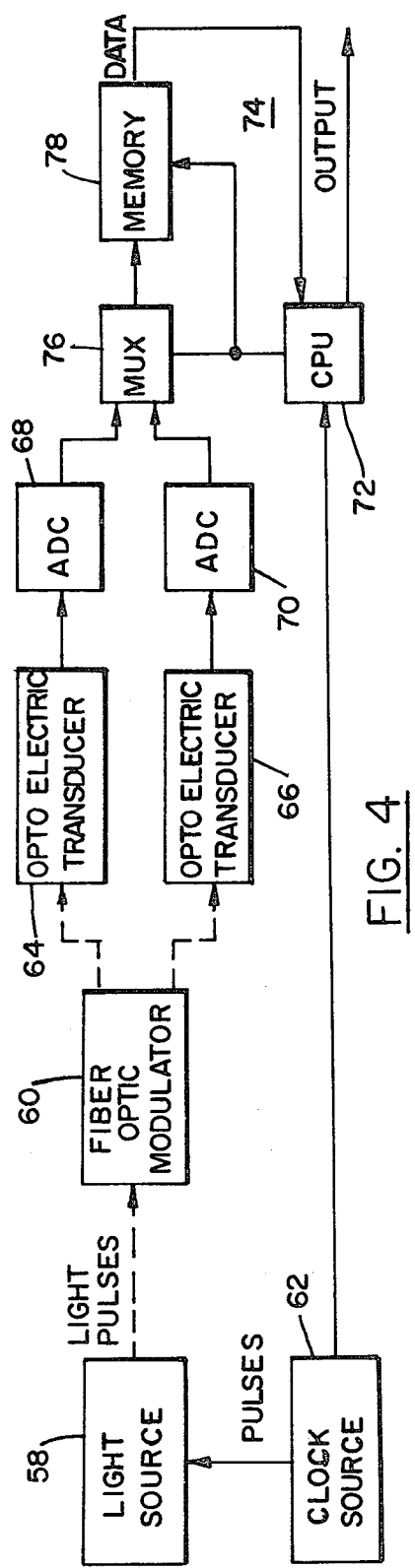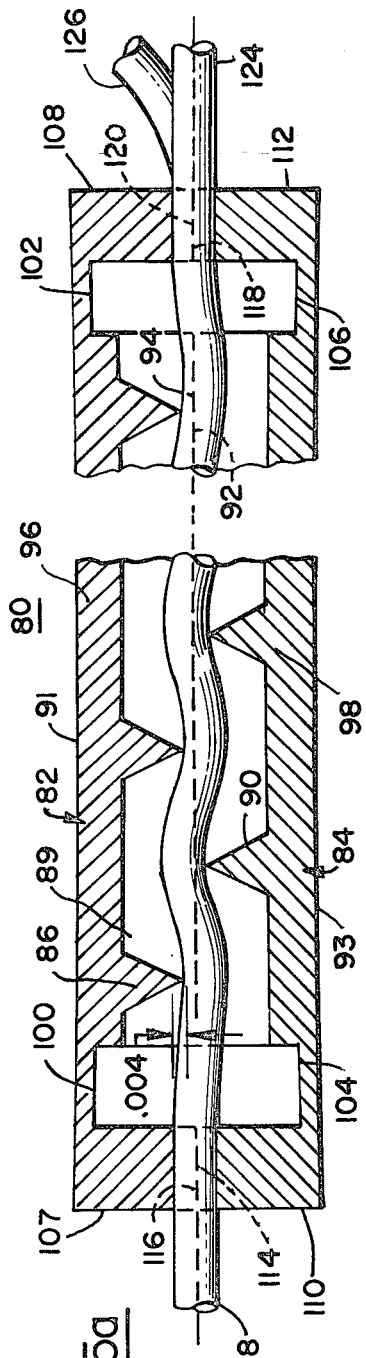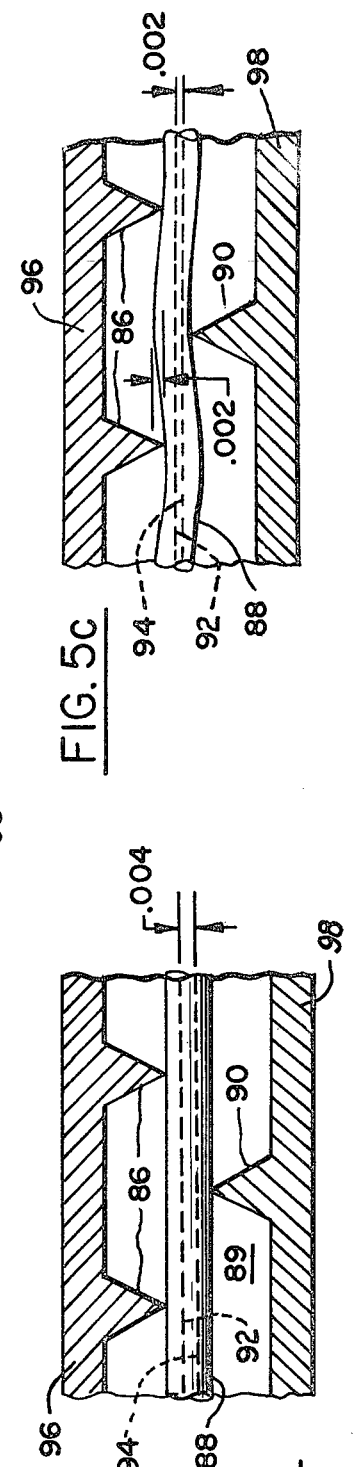

4,294,513

OPTICAL SENSOR SYSTEM

DESCRIPTION

The present invention relates to optical sensors and particularly to an optical transducer system utilizing optical waveguides which are deformed to amplitude modulate light in accordance with a parameter to be transduced.

This application is related to applications Ser. Nos. 74,268, and 74,269, filed concurrently herewith in the names of John V. Bouyoucos and David E. Nelson, and in the name of John V. Bouyoucos, respectively. These applications are assigned to the same assignee as the instant application.

The term "light" as used herein is intended to encompass both visible light as well as light in other parts of the spectrum than visible light which may be propagated by the optical waveguides which are used in the transducer system provided by the invention.

The invention is especially suitable for use with optical fiber waveguides which have a clad around a core; the clad being of material having a lower index of refraction than the core. Such optical fibers, when deformed, couple light which is propagated through the core into the clad in accordance with the amount of deformation of the fiber. By deformation is meant either flexure or deflection of the fiber or of the clad. The principle of variably coupling the light propagated from the core to the clad and thereby modulating the light in the core and in the clad, as well as means for removing or tapping the light from the clad have been heretofore described in Miller, U.S. Pat. No. 3,931,518 issued Jan. 6, 1976; Miller, U.S. Pat. No. 4,019,051 issued Apr. 19, 1977; Dyott, Pat. No. 4,135,780 issued Jan. 23, 1979; Jeunhomme & Pocholle, Appl. Phys. Lett., Vol. 29, No. 8,485 (15 Oct. 1976); and Keck, Schutz & Zimar, *Attenuation of Multimode Glass Optical Waveguides*, September, 1972).

The invention may also be used with other types of deformable optical waveguides where light modulated in accordance with the deformation extent may be available from more than one part of the waveguide. Such waveguides may operate in accordance with the principle of diffraction, variable absorption or other optical effects. Some of such waveguides are described in Maher, U.S. Pat. No. 4,128,299 issued Dec. 5, 1978 (Maher mentions six patents and patent applications therein, namely Conwell, Ser. No. 621,312; Brandt et al, 3,856,378; Snitzer 3,625,589; Sosnowski 3,802,760; Li et al, 3,804,489; and McNaney 3,704,060). An optical transducer having a flexible optical waveguide which is deformed to provide modulation of the light propagated therethrough which is relevant to the present invention is Wright 4,142,774 issued Mar. 6, 1979. Other optical transducers relevant to the invention in that the principle of deformation is used in the transduction of the parameter to be sensed are Witt 3,051,003 issued Aug. 28, 1962; and Duke 3,056,297 issued Oct. 2, 1962.

The invention is especially suitable for use in providing an optical hydrophone. A survey of various proposals for optical hydrophones is described in Shajenko, *Progress on Optical Hydrophones*, U.S. Navy Journal of Underwater Acoustics, Vol. 29, No. 2, 169 (April 1979) (see also Bucaro et al U.S. Pat. No. 4,162,397 issued July 24, 1979).

Optical transducers and particularly optical hydrophones have not found acceptance and have not been more advantageous to use than transducers using crystals principally because of problems in obtaining both a large dynamic range and high sensitivity as needed in many applications for such transducers, particularly under water as hydrophones. The dynamic range is restricted principally because of the limitations of the optical modulation scheme employed and the effects of optical/mechanical noise. Large dynamic range is needed in hydrophone applications, since in many instances the hydrophone must be able to observe a weak return signal in the presence of high power radiated signals. Sources of noise may be optical in nature and may be due to the light source which may vary in intensity. There is also inherent photon noise as well as shot noise in photodetectors and electrical signal amplifiers. Another significant source of noise, mechanical in nature, is generated in the optical fiber waveguide itself and may be due to deformation of the guide as it flexes. Such flexure can result prior to or after the transducer deformer and may have a similar effect in modulating the light remaining in the core and coupled to the clad. The dynamic range of the optical transducer first starts at this noise floor.

It is therefore a principal object of the present invention to provide an improved optical transducer system in which the effects of noise introduced into the system are minimized.

It is another object of the present invention to provide an improved optical transducer system having wide dynamic range of response to the parameter which is to be sensed and coupled to the output of the system.

It is a further object of the present invention to provide an improved fiber optic transducer system which may be used to sense various parameters, particularly acoustic signals, and is especially adapted to provide a hydrophone system.

It is a still further object of the present invention to provide an improved optical transducer system using an optical waveguide in which noise introduced due to the source of light which propagates through the guide as well as due to transmission through the guide itself is minimized.

It is a still further object of the present invention to provide an improved optical transducer which operates by selective deformation of an optical waveguide.

It is a still further object of the present invention to provide an improved optical transducer which amplitude modulates the output signal therefrom in accordance with the parameter being sensed.

It is a still further object of the present invention to provide an improved optical waveguide transducer, in which light coupled from the core to the clad of an optical waveguide is modulated by deforming the guide with the difference between the light in the core and in the clad being sensed to provide a differential sensor, wherein extraneous noise effects are minimized.

Briefly described, an optical transducer system according to an embodiment of the invention makes use of an optical waveguide. This waveguide may, for example, be a planar form waveguide or an optical fiber waveguide. The waveguide was juxtaposed portions of material which are transmissive of light and which are of different indexes of refraction. These portions extend longitudinally along the guide and may be the core and clad of an optical fiber waveguide. The waveguide is deformed in response to the parameter to be transduced as by means of a flexurally mounted member having a grating which causes a multiple flexure of a section of the guide. Such deformation modulates the amplitude of the light which is propagated along different paths in the guide. In the case of an optical fiber, both the light propagating through the core and through the clad are modulated with, for example, the light amplitude in the clad increasing while the light amplitude in the core is decreasing for increasing deformation, the total light remaining substantially constant. The light from the different paths is separately detected and an electrical output corresponding to the difference in amplitudes therebetween is provided. The means for providing this output may be an analog or digital difference circuit. The average or D.C. value of the signals, the difference between which is obtained, is desirably nulled. This may be accomplished by applying a mechanical bias to the deformer and/or by electrical circuit means which control the amplitude of electrical signals corresponding to the optical signals from the different paths in the guide, or both.

Whereas the mode coupling created by the deformer has been described as between the modes of propagation within the core and the clad of the waveguide as a preferred embodiment, other mode combinations may exhibit coupling for which differential sensing is useful. These other mode combinations may include, for example, sets of core modes of different order. A set of modes includes at least one mode and follows a distinct path of light propagation through the waveguide structure having light output which is separately detectable from light which propagates along other paths. Also, combination waveguide structures embodying multiple cores may be employed where the coupling due to deformation is between the several cores. Other combination structures may include guides with multiple clads. Fundamentally, the invention encompasses deformer means, sensitive to the parameter one wishes to sense, which can modulate light energy along two separate, guided paths such that the light energy increases along one path and decreases along the other path for a deformation of one polarity with respect to a mean deformation, and then decreases along the one path and increases along the other path for a deformation of the other polarity. Optical means, such as lenses, aperture plates, or special couplers may be used to assure that only the light which propagates along a desired path in the waveguide reaches the detector for that path. By measuring the difference in the light intensity along the two paths, an output is obtained which is proportional to the signal being sensed. At the same time, the differencing process tends to minimize noise energy which is propagated symmetrically along the two paths such as noise introduced at the light source or in symmetrical bending of the guided paths in regions other than at the deformer.

The foregoing and other objects, features and advantages of the present invention as well as presently preferred embodiments thereof will become more apparent from a reading of the following description in connection with the accompanying drawings in which:

FIG. 4 is block diagram illustrating an optical sensor system having digital circuits for providing the output therefrom;

Figures 1, 2, 3:
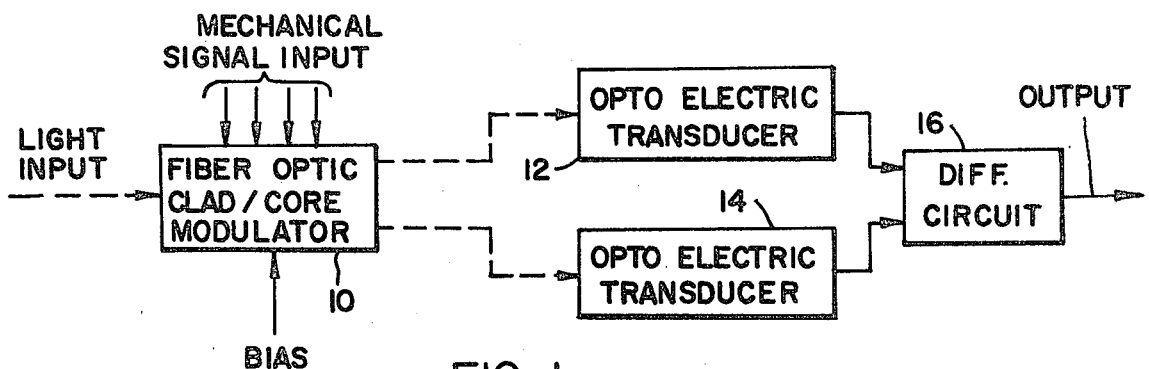
FIG. 1 is a block diagram showing an optical sensor system embodying the invention.
FIG. 2 is a more detailed block diagram illustrating an optical sensor system embodying the invention.
FIG. 3 is a block diagram showing an electronic system for obtaining the outputs from the optical modulator of the transducer system which is presently preferred for use when analog circuitry is desired.
Figure 6:
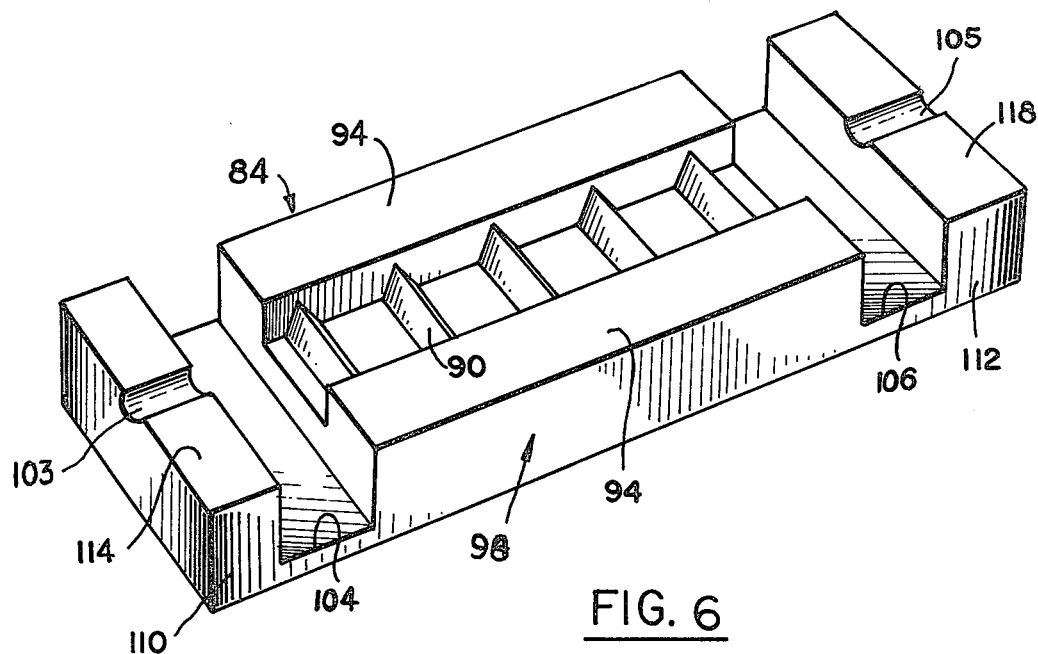
Figure 7:
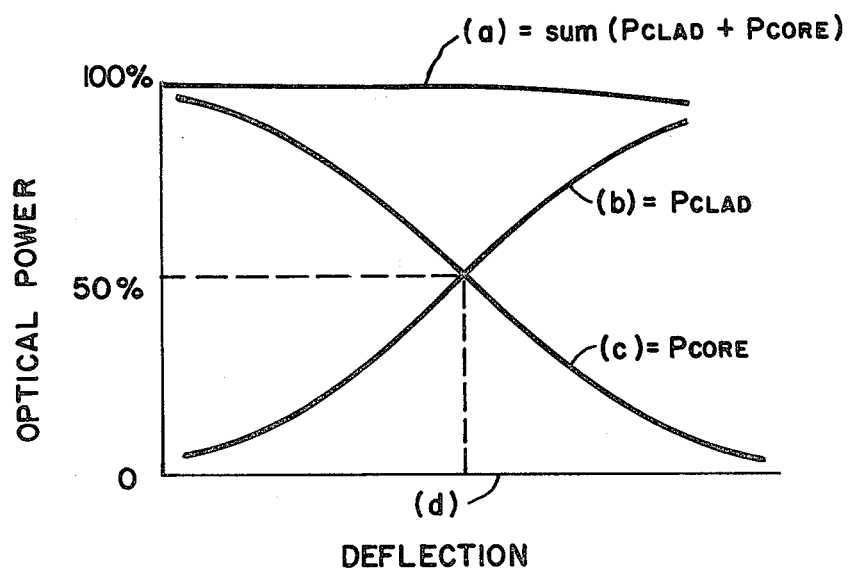

FIGS. 5a, b, and c, are sectional views (FIGS. 5b and c being fragmentary views of a portion of FIG. 5a) of a fiber optic modulator which may be used in a system embodying the invention such as illustrated in FIGS. 1, 2, and 4;

FIG. 6 is a perspective view illustrating the lower half of the device shown in FIG. 5a; and FIG. 7 is a plot of curves illustrating the operation of the device as shown in FIGS. 5a, b and c.

Referring more particularly to FIG. 1, a source of input light such as a laser or a light emitting diode is coupled to an optical waveguide which may be an optical fiber. This fiber is an exemplary and presently preferred waveguide structure which may be used in accordance with the invention. Other waveguide structures and other paths of propagation of light therein are also within the scope of the invention.

The fiber is part of a fiber optical modulator 10 in which the light propagated along the core of this first fiber is coupled partially to the clad. A tap, such as with a second optical fiber, is provided which removes the light which is coupled to the clad. The first optical fiber and the second optical fiber provide separate outputs from the modulator 10 to optoelectric transducers 12 and 14 which convert these optical signals into electrical signals. These electrical signals are applied to a difference circuit 16. An electrical output from the system thus corresponds to the difference in amplitude between the electrical signals from the optoelectric transducers 12 and 14 and their corresponding optical signals from the modulator 10. The optoelectric transducers employed in the system are preferably photodetectors such as PIN diodes. The type of photodetector which is selected will depend upon cost and packaging considerations.

The modulator 10 contains a deformer which enables the light which is coupled to the core of the fiber at the input of the modulator 10 to be partially coupled to the clad. Preferably a bias force is applied to the deformer. This bias insures that the electrical output from the difference circuit will be maintained at a minimum amplitude on an average or D.C. basis. In other words, the light which is coupled to the clad due to the bias will be of a sufficient amplitude to balance the remaining light in the core of the fiber. The optical signals from the second fiber which taps the clad and the optical signals from the first fiber are thus of approximately equal amplitude on a DC or average basis. The optoelectric transducers 12 and 14 thus provide average electrical signals which are nearly balanced. The difference circuit 16 can then be trimmed to provide a nulled average amplitude output. Now, in the presence of a mechanical signal input corresponding to the parameter to be transduced, the light coupled to the core and clad of the fiber will become unbalanced. For example, for an increasing deformation with respect to the average bias, more light is coupled to the clad than remains in the core. For a decreasing deformation with respect to the average bias, more light stays in the core than is coupled to the clad. The difference circuit 16 then provides an output corresponding to the dynamic mechanical signal (viz., an acoustic pressure variation). In the event that the transducer system is used under water for hydrophone applications, the acoustic signal may be a seismic wave propagated through the water or a sonar signal.

The light input may be communicated to the modulator 10 through a long optical fiber, for instance from the surface when the modulator is disposed under water in the hydrophone application. Noise is inherently present due to variations in the intensity or amplitude of the light source. Such noise variation may be photon noise or it may be due to variations in the power energizing the light source or other variations which affect the light amplitude. All of this noise is a component of the light propagated to the modulator. In addition, the fiber leading to the modulator 10 may be flexed and distorted. This can cause a portion of the signal power to be coupled to the clad or leak out of the fiber. Such leakage or coupling varies with the flexing of the fiber and also contributes to the noise component of the signal power. Such noise effectively amplitude modulates the optical carrier and is amplitude modulation noise. The modulator 10 is also an amplitude modulation device such that the noise component adds to the signal component. The amount of deformation of the fiber in the modulator 10 is limited. Also the mechanical strength of the fiber limits the dynamic range of the modulation of the optical signals from the modulator 10 as a result of the mechanical signal input. The noise component can thus occupy a significant portion of the dynamic range. Unless the noise component is eliminated, the total dynamic range of the transducer system is correspondingly limited.

Such limitations are removed by reason of the partitioning of the optical signals between two branches which signals are equal in intensity and the subsequent differential signal processing. The noise is equal in the separate outputs from the modulator and removed in the difference circuit 16. The parameter being sensed which is shown as the mechanical input to the modulator 10 is, however, not balanced because it varies the modulation of the light at the modulator outputs in opposite senses. Thus, the noise from the light source, from flexing of the input waveguide or output waveguides (as long as the latter flex together) is cancelled in the difference circuit 16 and does not appear in the output to a substantial extent. The output from the difference circuit 16 does vary in accordance with the mechanical input signal. The sensitivity of the transducer system is effectively enhanced since the noise component is nulled. The full dynamic range of the transducer is then available for utilization.

The equalizing of the noise may be accomplished in the electrical circuitry associated with the modulator or in the modulator itself by applying the bias. Both the bias and electrical circuit means may be provided to minimize the noise, and, by means of the differential circuit, to cancel it, thereby to increase the sensitivity and dynamic range of the system.

Referring to FIG. 2, the light input source is shown as a light emitting diode (LED) 18. This diode emits light which may be focussed, as by means of a lens or by close coupling, to the core 20 of the optical fiber waveguide 22. The light may be provided continuously, as when a switch 24 remains closed, or intermittently as pulses of light. The light propagates through the fiber 22 and is coupled from the core 20 to the clad 26 thereof, when the fiber is deformed. This deformation is shown as being the deflection of the fiber 22 between the teeth of gratings 28 and 30, between which the fiber 22 is sandwiched. A predetermined deformation in the form of a deflection of the fiber is provided by biasing the gratings 28 and 30 toward each other. Such biasing may be provided by spring means in a flexural support for the gratings 26 and 28 will be described hereinafter in connection with FIG. 5. Alternatively, the deformation may be provided externally, for instance, in the case of a hydrophone or microphone, by the static ambient pressure. It is recognized that in many cases the mechanical biasing means will be imperfect, and the desired optical/electrical balance between the two outputs will not be struck. In this case, an electrical balance following the photodetectors 34 and 36 will suffice. Therefore, in the instant embodiment both a mechanical bias and electrical balancing are provided for.

A second optical fiber 32 is coupled to the fiber 22 past the deformer gratings 28 and 30 to extract light propagating in the clad. The fibers 22 and 32 provide the separate optical signals to optoelectric transducers in the form of photodetector diodes 34 and 36. It will be appreciated that phototransistors may also be used as the optoelectric transducers. The mechanical input signals may be applied to one of the gratings 28 or 30 directly or by means of a diaphragm and mechanical linkage. In the event that the system is used as a hydrophone it may be desirable to compensate for any deformation due to water pressure which increases with depth as the hydrophone descends below the surface. To this end, pressure compensation means may be provided for increasing the pressure in the volume between the gratings 26 and 28 which contains the fiber 22. A hydrophone having such pressure compensating means is the subject matter of the above referenced related application filed in the name of John V. Bouyoucos, concurrently herewith.

The difference circuit is provided by an inverting amplifier 38 and a variable gain amplifier 40. The outputs of these amplifiers when summed in a summing circuit 42 is the difference between the electrical signals corresponding to the pair of optical signals from the fibers 22 and 32 which are converted into the electrical signals by the diodes 34 and 36. To balance the signals so that the DC or average values are equalized and the noise is similarly equalized and cancelled in the summing circuit 42, there is provided a feedback circuit having a lowpass filter 44 and the variable gain amplifier 40. The lowpass filter may have a cutoff at a very low frequency (e.g., a few Hz). Then the gain in the path for amplifying the electrical signal from the diode 36, corresponding to the optical signal from the fiber 22, is varied until the DC or average value of the amplitude thereof is equal to the amplitude of the signal from the other diode 34, corresponding to the optical signal from the fiber 32. The difference in the amplitudes of these electrical signals is obtained from the difference circuit made up of the inverting amplifier 38 and summing circuit 42. The difference signal is applied to the gain feedback loop; and with sufficient loop gain, tends to drive the difference to zero. Of course, the feedback circuit may alternatively be on the opposite side and applied to control the gain of the inverting amplifier which then is a variable gain stage.

It is preferred, however, to normalize the amplitude of the signals from the photodetectors ahead of the summing circuit 42. Normalization may be implemented, as shown in FIG. 3, by circuitry having two variable gain amplifiers 45 and 46. The average value of the amplitudes of the electrical signals at the outputs of these amplifiers 45 and 46 is normalized to be equal to a reference amplitude equal to the voltage $V_{REF}$ from a reference potential source shown as a battery 48. Difference amplifiers 50 and 52 are connected respectively to the outputs of the variable gain amplifiers 46 and 45 and to the source 48. The outputs of the differential amplifiers are filtered in lowpass filters 54 and 56 having low cutoff frequencies, again of a few Hz, and applied as error signals to control the gain of the variable gain amplifiers 45 and 46. It will be noted that the lowpass filters 44, 54 and 56 have frequencies below the lowest frequency in the frequency spectrum of the mechanical signals applied as the signal input to the deformer of the modulator (viz., to both the gratings 28 and 30 as shown in FIG. 2). By reason of the automatic gain control provided by the feedback circuits including the differential amplifiers 50 and 52 and the filters 54 and 56, not only are the electrical signals corresponding to the optical outputs from the fibers equalized in their average or DC values, but the electrical signal output for a given percent change in light occurring at the FOM (fiber optic modulator) is normalized as well. That is, the normalization corrects for such unwanted variations as the intensity of the light source 18 or losses in the transmission fibers 20, 32. The difference circuit including the inverting amplifier 38 and the summing circuit 42 thus provides an electrical output which is (a) standardized in output for a given FOM modulation, thus eliminating variations of light intensity in the system other than for which the parameter being sensed is responsible and (b) in which the noise components are substantially eliminated.

The circuits shown in FIGS. 2 and 3 are analog circuits and it may be desirable, particularly when several fiber optic modulators are provided in an array, to process the electrical signals on a digital basis. An exemplary digital system is shown in FIG. 4. This system includes a light source 58, such as may contain a light emitting diode or several light emitting diodes each associated with a different fiber optic modulator 60. These modulators may each be of the type described in connection with FIGS. 1 and 2. The light source may include a switch, such as a switching transistor circuit, which is repetitively enabled by a train of pulses produced by the clock source 62. The clock source 62 also provides an additional train of pulses which may be delayed from the first train of pulses and which identify the time of the return of the light pulses after propagating through the optical waveguide system. These latter clock pulses are synchronous with the clock pulses which operate the light source 58 and control processing of the optical signals.

The separate outputs from the modulator or modulators 60 are translated into electrical signals by optoelectric transducers 64 and 66. These outputs are sampled by analog to digital converters (ADC) 68 and 70. The delayed pulses from the clock source 62 are applied to processing unit (CPU) 72 of a digital processing system 74. The processing unit may be a microprocessor of the type generally available, which provides sampling and address signals to a multiplexer (MUX) 76. The digital output signals from the converters 68 and 70 are thus sampled at a rate controlled and synchronous with the pulses which activate the light source and produce the light pulses.

Accordingly, each light pulse will produce a pair of outputs in the form of digital signals which are selected by the multiplexer 76 and stored in a memory 78. Two digital signals are provided for each light pulse and are read out of the memory on data lines to the CPU 72 where they are normalized and subtracted from each other to provide the differential output. This differential output may be a digital signal which is available at the output ports of the CPU. Alternatively, the digital signal may be applied to a digital to analog converter and reconverted into analog form. It will be appreciated that the normalization and filtering process as carried on on an analog basis in the systems described in connection with FIGS. 2 and 3 are provided for digitally by manipulation of the digital signals from the memory in the CPU 72 in accordance with a program stored therein or in the memory 78. Thus the memory 78, multiplexer 76, and CPU 72 operate both as the normalization circuits and as the difference circuits which was described in connection with FIGS. 1, 2 and 3.

Referring to FIGS. 5 and 6, there is shown a deformer 80 which has an upper section 82 and a lower section 84 of like configuration. The lower section is illustrated in FIG. 6. Grooves 104 and 106 separate a central portion 98 of the lower section from the ends 110 and 112 thereof. The grooves 104 and 106 enable the central portion to flex with respect to the ends 110 and 112. The portion 98 of the lower section 84 of the deformer 80 has a row of teeth 90. These teeth are offset from each other longitudinally of the fiber 88 which is deformed. The teeth are disposed to periodically deform, by flexure, the fiber 88 as shown in FIG. 5a. The upper section 82 also has a central portion 96 with teeth 86 which are offset in a direction longitudinally of the fiber 88 from the teeth 90 in the lower section 84. The upper section 82 also has grooves 100 and 102 which separate the central portion 96 from the ends 107 and 108 of the upper section 82 and enable the central portion 96 to flex with respect to the ends 107 and 108 thereof. Except for longitudinal grooves (shown in FIG. 6 as the grooves 103 and 105 in the ends 110 and 112 of the lower section 84), the ends 107, 110 and 108, 112 of the upper and lower sections have their surfaces, shown at 114 and 118 in FIG. 6 and by the dark lines at 114 and 118 in FIG. 5a, in contact. The inner surface 94 of the central portion 98 of the lower section is opposed to the inner surface 92 of the central portion 96 of the upper section. These surfaces are coincident as shown by the dash line identified by both reference numerals 92 and 94 in FIG. 5a at the maximum inward flexure of the central portions 96 and 98 (which is the maximum flexure and deformation of the fiber 88). The surfaces 92 and 94 are apart at less than maximum deflection of the fiber, as when the fiber 88 is not flexed, as shown in FIG. 5b and when the bias deformation alone is applied to the fiber 88 as shown in FIG. 5c. The teeth 90 are offset from surface 94 of the central portion 98 of the lower section 84 as shown best in FIG. 6. The teeth 86 are similarly offset from the surface 92 of the central portion 96 of the upper section 82.

Because of the separation of the teeth 86 and 90 in the upper and lower grating section 82 and 84, in the absence of external pressure applied to the outer surfaces 91 and 93 of these sections, a predetermined bias is flexurally applied to the fiber.

For purposes of illustration, consider that the fiber 88 has a diameter of 10 mils (0.010 inch) and the predetermined deflection which is desired is 2 mils as shown in FIG. 5c. Now the deformer permits only a maximum deflection of 4 mils as shown in FIG. 5a, inasmuch as the opposing surfaces 94 and 92 of the central grating portions 96 and 98 come together into contact as shown in FIG. 5a. This prevents damage to the fiber.

When the pressure on surfaces 91 and 93 external of the chamber 89 decreases on a dynamic basis with respect to the pressure internal thereto, the teeth 86 and 90 move apart from each other to a position where the initial mechanical bias is effectively removed. The opposing surfaces 94 and 92 of the grating portions 96 and 98 then become separated by 4 mils as shown in FIG. 5b. It will therefore be seen that in order to provide for a maximum allowable dynamic deflection of the fiber of 2 mils, with a 10-mil diameter fiber, the height of the teeth 86 and 90 below the surfaces 92 and 94 is 4 mils or one-half the fiber diameter minus one-half the allowable deflection. These dimensions are shown in FIG. 5a.

FIG. 7 illustrates the relationship between the intensity of the light (viz., the optical signal) obtained from the core of the fiber 88 at the output end thereof and from the fiber 126 which taps the light which is coupled into the clad of the fiber 88. A predetermined deflection indicated in FIG. 7 as (d), exists where these intensities are balanced and the power of the light coupled to the clad, indicated as curve (b) equals the power of the light remaining in the core as indicated by the curve (c). The power is equally portioned, split 50% into the clad and 50% into the core. The sum of the clad and core optical power remains close to 100% over the deflection range. This is shown by curve (a) of FIG. 7. It will, therefore, be observed that at the predetermined deformation which is shown as a deflection (d) in FIG. 7, the optical signals are balanced. This balance condition is upset by varying deflection. Such varying deflection may be caused by mechanical signals in the form of pressure differentials applied to the outside surfaces 91 and 93 of the deformer, for example, by acoustical energy applied thereto or otherwise by the parameter being sensed. Thus, as the deflection varies dynamically the output signals from the difference circuit whether implemented by analog means as shown in FIGS. 2 and 3 or digitally as shown in FIG. 4, corresponds to the parameter which is being transduced, while the noise components remain balanced or nulled in the output.

From the foregoing description it will be apparent that there has been provided an improved optical transducer system. The system has many applications as a sensor or transducer for varying types of mechanical signals which may be obtained by acoustic pressure variations or in response to other effects which can be translated into a mechanical signal, (e.g., acceleration). Variations and modifications of the hereindescribed system, for example to utilize different paths of propagation in the fiber or different optical waveguides or to take advantage of mechanical signals which correspond to various parameters, will undoubtedly suggest themselves to those skilled in the art. Accordingly the foregoing description should be taken as illustrative and not in a limiting sense.

We claim:

1. An optical sensor system which comprises an optical waveguide, first and second means each for detecting light which is propagated along different paths in said waveguide to reach said detection means, means for deforming said waveguide to provide a bias deformation which, on the average, approximately equally partitions the light energy which propagates to said detecting means along said different paths, and to modulate the partitioning of light energy between said paths in response to the parameter to be sensed, and means for providing an electrical output corresponding to the difference between light energies detected by said first and second detection means.

2. The invention as set forth in claim 1 further comprising means for minimizing the average amplitude of said electrical output.

3. The invention as set forth in claim 2 wherein said first and second detecting means provide first and second electrical signals and wherein said minimizing means includes means for normalizing said electrical signals, and means responsive to the difference between said normalized electrical signals for providing said electrical output.

4. The invention as set forth in claim 1 wherein said first and second detecting means provide first and second electrical signals, said electrical output providing means including feedback means for balancing the average amplitude of said electrical signals.

5. The invention as set forth in claim 4 wherein said feedback means comprises a lowpass filter circuit having a cutoff frequency below the lowest frequency of interest in said electrical output, and means for feeding back said electrical output through said filter circuit for controlling the amplitude of at least one of said first and second electrical signals.

6. The invention as set forth in claim 4 wherein said balancing means comprises first and second gain control circuits responsive to said first and second electrical signals for normalizing the average amplitudes thereof to equal a predetermined value and means responsive to said first and second signals after normalization to derive the difference in amplitude therebetween to provide said electrical output.

7. The invention as set forth in claim 1 further comprising pulse generating means for generating synchronous light and electrical pulses in succession, said generating means including means for applying said light pulses to said waveguide ahead of said deforming means, said first and second detecting means providing first and second electrical signals, said electrical output providing means comprising means for converting said electrical signals into successive digital signals, and data processing means operated by said electrical pulses from said generating means for providing output data signals corresponding to said electrical output.

8. The invention as set forth in claim 1 wherein said deforming means comprises at least one grating having teeth, a pair of members at least one of which flexurally supports said grating, said members being opposed to each other with said waveguide therebetween and adjacent said teeth, said members having opposed surfaces which have a predetermined separation therebetween and come into contact when said grating imposes a maximum deformation upon said waveguide.

9. The invention as set forth in claim 1 wherein said deforming means comprises at least one grating member, and means for flexurally supporting said grating member in contact with said waveguide to provide said bias deformation.

10. The invention as set forth in claim 1 wherein said deforming means comprises a pair of gratings having teeth, a pair of members having means flexurally supporting said gratings opposed to each other with said waveguide therebetween, said flexural supporting means yieldably urging said gratings toward each other to provide said bias deformation.

11. An optical transducer system which comprises an optical waveguide having juxtaposed portions of material of different indexes of refraction which extend longitudinally, means for deforming said waveguide in response to the parameter to be transduced whereby to modulate the amplitude of the light propagated through said portions of said waveguide, and means for separately removing the light propagating through each of said portions and providing an electrical output corresponding to the difference in amplitudes therebetween.

12. The invention as set forth in claim 11 further comprising means for minimizing the amplitude of said electrical signal output in the absence of said parameter.

13. The invention as set forth in claim 12 wherein said minimizing means comprises means for providing a pre-determined bias upon said waveguide to deform said guide to an extent sufficient to equalize the amplitude of light removed from each of said portions.

14. The invention as set forth in claim 12 wherein said minimizing means further comprises means for normalizing electrical signals corresponding to the light separately removed from each of said portions, and means responsive to the difference between said normalized electrical signals for providing said electrical output.

15. The invention as set forth in claim 12 wherein said minimum amplitude providing means comprises electrical signal processing means for equalizing the average value of said electrical output corresponding to the light removed from each of said portions.

16. The invention as set forth in claim 12 wherein said minimum amplitude providing means comprises means for providing a flexural bias upon said waveguide such that the amplitude of light removed from said portions is approximately equalized, electrical signal processing means for equalizing the average value of said electrical output corresponding to the light removed from each of said portions.

17. The invention as set forth in claim 11 wherein said optical waveguide is an optical fiber having a core and a clad respectively providing said portions of different indexes of refraction, said deforming means comprising means responsive to said parameter for applying pressure to deform at least said clad of said fiber to vary the amplitude of the light propagating through said clad and said core, said removing means and electrical output providing means including a second optical fiber coupled to said clad for tapping the light from said clad, photodetector means for providing separate electrical signals corresponding respectively to the light propagated by said first named and second fibers, and a difference circuit means responsive to said separate electrical signals for providing said electrical output.

18. The invention as set forth in claim 17 wherein said deforming means comprises means for applying a pre-determined pressure upon said fiber to apply a mechanical bias thereto such that the amplitudes of the light coupled to said clad and propagating in said core past said deforming means are equalized.

19. The invention as set forth in claim 18 wherein said deforming means comprises at least one grating member, means flexurally supporting said grating member in contact with said fiber for providing said bias.

20. The invention as set forth in claim 17 wherein said deforming means comprises a pair of gratings having successive teeth, a pair of members having means flexurally supporting said gratings opposed to each other with said first fiber therebetween and said teeth of said gratings offset from each other longitudinally of said fiber, said members having opposed surfaces, said gratings each being disposed a distance from said opposed surfaces toward said first fiber equal to a predetermined maximum deformation of said fiber, said flexural supporting means of said members yieldably urging said gratings toward each other with a predetermined force to provide a predetermined bias deformation of said first fiber.

21. The invention as set forth in claim 17 wherein said difference circuit includes feedback means for balancing the average amplitude of said electrical signals which correspond to the light propagated by said first and second fibers.

22. The invention as set forth in claim 21 wherein said feedback means comprises a low pass filter circuit having a cutoff frequency below the lowest frequency of interest in said electrical output, and means for feeding back said output through said filter circuit for controlling the amplitude of at least one of said electrical signals.

23. The invention as set forth in claim 21 wherein said balancing means comprises first and second gain control circuits respectively responsive to different ones of said electrical signals for normalizing the average amplitudes thereof to a predetermined value, and means responsive to said signals after normalization to derive the difference in amplitude therebetween for providing said electrical output.

24. The invention as set forth in claim 17 further comprising pulse generating means for generating synchronous light and electrical pulses, said generating means including means for applying said light pulses to said fiber ahead of said deforming means, and said difference circuit means comprising means for converting said electrical signals into successive digital signals, and data processing means operated by said electrical pulses from said generating means for providing output data signals corresponding to said electrical output.

25. The invention as set forth in claim 11 wherein said deforming means comprises a pair of gratings having teeth, a pair of members flexurally supporting said gratings opposed to each other with said waveguide therebetween, said members having opposed surfaces which have a predetermined separation therebetween and come into contact with each other when said gratings impose a maximum deformation upon said waveguide.

26. An optical transducer system which comprises an optical waveguide having juxtaposed portions of material of different indices of refraction which extend longitudinally, means for introducing light energy into at least one of said portions, means for deforming said waveguide to provide a bias deformation which, on the average, partitions the light energy between said portions such that the light energy propagating away from said one portion is substantially reduced in magnitude, and the light energy propagating away from another of said portions is substantially increased in magnitude relative to the magnitudes present in the absence of said bias, and to modulate the partitioning of light energy between said portions around said average partitioning in response to the parameter to be sensed, and means for separately removing the light propagating through each of said portions and providing an electrical output corresponding to the difference in amplitudes therebetween such that in the absence of the parameter to be sensed the electrical output tends to zero.

27. The invention as set forth in claim 26 wherein said optical waveguide is an optical fiber having a core and a clad respectively providing said portions of different indices of refraction, said deforming means comprising means responsive to said parameter for applying pressure to deform at least said clad of said fiber to vary the amplitude of the light propagating through said clad and said core, said removing means and electrical output providing means including a second optical fiber coupled to said clad for tapping the light from said clad, photodetector means for providing separate electric signals corresponding respectively to the light propagated by said first named and second fibers and a difference circuit means responsive to said separate electrical signals for providing said electrical output which tends to zero in the absence of the parameter to be sensed.

28. The invention as set forth in claim 27 wherein said deforming means comprises means for applying a predetermined pressure upon said fiber to provide said bias deformation.

29. An optical transducer system which comprises an optical waveguide having juxtaposed portions of material of different indices of refraction which extend longitudinally in at least one of which light propagates in different modes, means for introducing light energy into at least one portion, means for deforming said waveguide to provide a bias deformation which, on the average, partitions the light energy between said different modes such that the light energy propagating in one of said different modes is substantially reduced in magnitude, and the light energy propagating in another of said different modes is substantially increased in magnitude relative to the magnitudes present in the absence of said bias, and to modulate the partitioning of light energy between said modes around said average partitioning in response to the parameter to be sensed, and means for detecting light separately propagating in said one and said other of said different modes and providing an electrical output corresponding to the difference in amplitudes therebetween such that in the absence of the parameter to be sensed the electrical output tends to zero.

* * * * *